United States Patent [19]

Kawai et al.

[11] Patent Number: 4,801,195
[45] Date of Patent: Jan. 31, 1989

[54] VARIABLE LIGHT TRANSMITTANCE GLASS BOARD FUNCTIONAL AS ELECTROCHROMIC CELL

[75] Inventors: Mikio Kawai; Harutoshi Miyagi; Mikio Ura, all of Yokohama, Japan

[73] Assignee: Nissan Motor Co., Ltd., Yokohama, Japan

[21] Appl. No.: 810,687

[22] Filed: Dec. 19, 1985

[30] Foreign Application Priority Data

Jan. 29, 1985 [JP] Japan .................. 60-15193
Feb. 5, 1985 [JP] Japan .................. 60-19186

[51] Int. Cl.$^4$ ................................. G02F 1/01
[52] U.S. Cl. ..................... 350/357; 252/600
[58] Field of Search ........... 252/600 APS; 350/357; 423/419 R

[56] References Cited

U.S. PATENT DOCUMENTS

| | | | |
|---|---|---|---|
| 2,895,892 | 7/1959 | Chalkley | 204/157 |
| 3,774,988 | 11/1973 | Rogers | 350/357 |
| 4,205,903 | 6/1980 | Inami et al. | 350/357 |
| 4,348,077 | 9/1982 | Kondo et al. | 350/357 |
| 4,436,380 | 3/1984 | Yano et al. | 350/357 |
| 4,498,739 | 2/1985 | Itaya et al. | 350/357 |
| 4,519,930 | 5/1985 | Kakiuchi | 252/600 |
| 4,599,614 | 7/1986 | DeBerry et al. | 350/357 |

FOREIGN PATENT DOCUMENTS 0068635 1/1983 European Pat. Off. .
59-155833 9/1984 Japan .
59-159134 9/1984 Japan .

Primary Examiner—Matthew A. Thexton
Assistant Examiner—Catherine S. Kilby
Attorney, Agent, or Firm—Foley & Lardner, Schwartz, Jeffery, Schwaab, Mack, Blumenthal & Evans

[57] ABSTRACT

The invention relates to a variable light transmittance glass board which is an electrochromic cell in principle and is comprised of oppositely arranged two transparent glass substrates each of which is laid with a transparent electrode film, first and second electrochromic layers formed on the two electrode films, respectively, by using tungsten trioxide for the first layer and Prussian blue for the second layer and an electrolyte liquid which fills up the space remaining between the two electrode films. The electrolyte liquid is a solution of a conventional supporting electrolyte such as lithium perchlorate in an organic polar solvent such as propylene carbonate. Durability of both electrochromic layers at elevated temperatures is greatly improved by adding 0.2–3.0 wt % of water to the organic polar solvent. By using one or two auxiliary electrode(s) comprising an electrochemically oxidizable and reducible material and being disposed in a marginal region of the space between the two glass substrates, it is possible to prevent the appearance of the glass board from being marred by partial decomposition of the electrolyte liquid at the initial reduction of one electrochromic layer. A polymer of a conjugated compound, e.g. polytriphenylamine, is very advantageous as the electrochemically active material in each auxiliary electrode.

9 Claims, 3 Drawing Sheets

VARIABLE LIGHT TRANSMITTANCE GLASS BOARD FUNCTIONAL AS ELECTROCHROMIC CELL

BACKGROUND OF THE INVENTION

This invention relates to a variable light transmittance glass board which is functional as an electrochromic cell. More particularly, the glass board is comprised of two transparent glass substrates each of which carries a transparent electrode layer such that the two transparent electrode layers are held opposite to and spaced from each other, first and second electrochromic layers formed on the two transparent electrode layers, respectively, by using tungsten trioxide for the first electrochromic layer and Prussian blue for the second electrochromic layer, and an electrolyte liquid which fills up the gap between the first and second electrochromic layers.

We have disclosed an electrochromic cell of the above construction in Japanese patent application primary publication No. 59-155833 (1984) and corresponding U.S. patent application Ser. No. 696,922 filed Jan. 31, 1985. Usually the electrolyte liquid is a solution of a supporting electrolyte such as a lithium salt in an organic polar solvent such as propylene carbonate. In this electrochromic cell the first electrochromic layer using tungsten trioxide assumes a blue color in its electrochemically reduced state, whereas the second electrochromic layer using Prussian blue assumes a deep blue color in its electrochemically oxidized state.

Such an electrochromic cell is useful as a display device and, besides, can be used as a glass board of which the transmittance of light is variable by coloring and bleaching of the electrochromic layers. If the variable light transmittance glass board is to be used in automobiles for the instrument panel, sun-roof panel, side windows or sun visors, the glass board is required to exhibit good durability as an electrochromic cell even at elevated temperatures. According to some manufacturers' standards it is required that after subjecting the variable transmittance glass board to accelerated aging at 90° C. for 1000 hr the quantity of electricity transferred at coloring and bleaching of the electrochromic layers be not less than 60% of the initial value measured on the same sample in fresh state. However, according to our experiments the heating at 90° C. for 1000 hr often causes the quantity of electricity transferred at the coloring and bleaching to decrease to only about 35% of the initial value, so that the variable transmittance glass board becomes poor in its shading capability.

There is another problem in the same electrochromic cell. In producing this cell, the tungsten trioxide layer and the Prussian blue layer are both formed in electrochemically oxidized state. Therefore, it is necessary to electrochemically reduce one of the electrochromic layers before using the cell in order that the two electrochromic layers may simultaneously assume color and simultaneously bleach. This reduction treatment is called the initial reduction. As the initial reduction is performed there occurs partial decomposition of the electrolyte liquid on the surface of the opposite electrochromic layer by reason of existence of inevitable impurities. The problem arises from this phenomenon. Since bubbles are formed by such decomposition of the electrolyte liquid, the appearance of the electrochromic cell or variable transmittance glass board is marred.

As a solution to this problem, Japanese patent application primary publication No. 59-159134 (1984) proposes an electrochromic cell of the above described type characterized by the addition of at least one auxiliary electrode, which comprises an electrochemically oxidizable and reducible material and is disposed in a marginal region of the cell. At the initial reduction of one electrochromic layer the auxiliary electrode is used as a counter electrode. Then the electrochemically active material in the auxiliary electrode undergoes oxidation so that the decomposition of the electrolyte liquid on the surface of the other electrochromic layer is avoided. However, in a large-sized electrochromic cell useful as a variable light transmittance glass board the effect of the auxiliary electrode will be insufficient unless the active material in the auxiliary electrode is very large in the quantity of electricity it gains per unit volume at its oxidation or the auxiliary electrode is made large in size. The auxiliary electrode materials named in Japanese No. 59-159134 are not sufficiently large in the quantity of electricity per unit volume. On the other hand, it is unfavorable to enlarge the size of the auxiliary electrode because of a decrease in an effective transmissive area of the electrochromic cell or variable transmittance glass board.

SUMMARY OF THE INVENTION

It is an object of the present invention to provide a variable light transmittance glass board which is an electrochromic cell in principle and which exhibits good durability even at elevated temperatures.

It is a further object of the invention to employ an auxiliary electrode for the above described purpose in a variable light transmittance glass board according to the invention by using an electrochemically oxidizable and reducible material which is sufficiently large in the quantity of electricity it gains per unit volume at its oxidation.

The present invention provides a variable light transmittance glass board, which is functional as an electrochromic cell and comprises two transparent glass substrates each of which is laid with a transparent electrode film and which are arranged such that the two transparent electrode films are held opposite to and spaced from each other, a first electrochromic layer which comprises tungsten trioxide and is formed on one of the two transparent electrode films, a second electrochromic layer which comprises Prussian blue and is formed on the other of the two electrode films, and an electrolyte liquid which fills up the space remaining between the two transparent electrode films. As the primary feature of the invention, the electrolyte liquid is a solution of a supporting electrolyte in an organic polar solvent to which 0.2–3.0 wt% of water is added.

With respect to an electrochromic cell of the transmissive type using tungsten trioxide $WO_3$ for one electrochromic layer and Prussian blue $Fe_4[Fe(CN)_6]_3$ for the opposite electrochromic layer, we have discovered that durability of both electrochromic layers becomes good when the organic polar solvent used in the electrolyte liquid contains a strictly limited amount of water. In an electrochromic cell or variable transmittance glass board according to the invention, which is subjected to an accelerated aging test at 90° C. for 1000 hr, the quantity of electricity transferred at coloring and bleaching of the electrochromic layers remains at or above 60% of the initial value measured on the same sample in fresh state. Accordingly, this variable transmittance glass board can be employed in commercial automobiles for example, for the instrument panel, side windows, sun-roof panel or sun visors.

In this invention both the supporting electrolyte and the organic solvent can be selected from ones used in conventional electrochromic cells. A typical combination is lithium perchlorate and propylene carbonate.

As to the electrochemically oxidizable and reducible material for the auxiliary electrode, the present invention proposes to use a polymer of a conjugated compound such as, for example, triphenylamine which is remarkably large in the quantity of electricity it gains per unit volume at its oxidation. By using such a polymer, the auxiliary electrode can be made very effective for prevention of decomposition of the electrolyte liquid at the initial reduction of one electrochromic layer without undesirably enlarging the size of the auxiliary electrode. Each auxiliary electrode in this invention can be used also for prevention of fading of the blue color of each electrochromic layer by keeping a potential difference between that electrochromic layer and the auxiliary electrode. The electrochemical oxidation reaction of the auxiliary electrode material according to the invention is not influenced by the presence of water in the electrolyte liquid and does not adversely affect the color of the electrochromic layers. Accordingly, each auxiliary electrode in this invention can be located close to the electrochromic layers, so that an effective transmissive area of the glass board is not greatly decreased by the provision of one or two auxiliary electrode(s).

DESCRIPTION OF THE PREFERRED EMBODIMENTS

Figure 1:
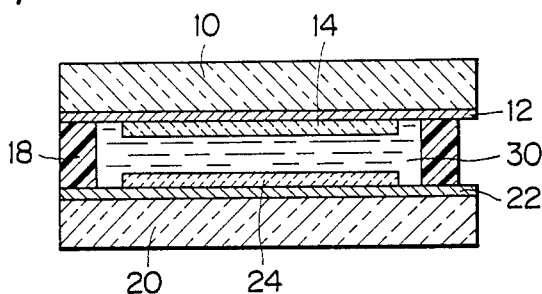
FIG. 1 is a sectional and schematic view of a variable light transmittance glass board according to the invention.

FIG. 1 shows the fundamental construction of a variable light transmittance glass board according to the invention. This board is functional as an electrochromic device. The board has top and bottom glass substrates 10 and 20 both of which are transparent. A transparent electrode film 12 is deposited on the inside surface of the top glass substrate 10, and a first electrochromic layer 14 is formed on the electrode film 12. For this layer 14 the electrochromic material is $WO_3$. Usually this electrochromic layer 14 is formed by a vacuum deposition method such as sputtering or vacuum evaporation. Another transparent electrode film 22 is deposited on the bottom glass substrate 20, and a second electrochromic layer 24 is formed on this electrode film 22. For this layer 24 the electrochromic material is Prussian blue $Fe_4[Fe(CN)_6]_3$. Usually this electrochromic layer 24 is formed by an electrodeposition method though it is also possible to use a solution coating method. Usually the transparent electrode films 12 and 22 are formed of $SnO_2$ or $In_2O_3$. The two glass substrates 10 and 20 are held spaced from each other by a thin layer 18 of a sealing material, which is applied peripherally of the substrates 10, 20 so as to surround the electrochromic layers 14, 24. The space defined between the two substrates 10 and 20 by the peripheral seal 18 is filled with an electrolyte liquid 30.

In this invention the electrolyte liquid is a solution of a supporting electrolyte in an organic polar solvent to which 0.2–3.0 wt% of water is added. Usually the supporting electrolyte is selected from alkali metal compounds, and it is preferred to use a lithium compound such as $LiClO_4$, $LiPF_6$, or $LiBF_4$. Preferred examples of organic polar solvents for use in this invention are propylene carbonate, acetonitrile, dimethylformamide and $\gamma$-butyl lactone.

EXPERIMENT

The following is a description of an example of experiments the inventors have conducted in the course of making the present invention. The experiment was on the manners of deterioration of a $WO_3$ film and a Prussian blue film by aging in an electrolyte liquid using propylene carbonate and containing a variable amount of water.

The $WO_3$ film samples were each prepared by vacuum deposition of $WO_3$ onto a glass substrate, which was precedingly coated with a $SnO_2$ electrode film, to a thickness of 4000 Å over an area of 2 cm². The Prussian blue film samples were each prepared by electrodeposition of $Fe_4[Fe(CN)_6]_3$ from an aqueous mixed solution of $FeCl_3$ and $K_3Fe(CN)_6$ onto a glass substrate, which was precedingly coated with a $SnO_2$ electrode film, to a thickness of 2000 Å over an area of 2 cm². Each sample was put into a glass tube having a closed end, and an electrolyte liquid was poured into the tube until complete immersion of the sample in the electrolyte liquid. The electrolyte liquid was prepared by dissolving 1 mole of $LiClO_4$ in 1 liter of propylene carbonate to which a variable amount of water was added in advance. The amount of water was varied within the range from 0.01 to 10 parts by weight per 100 parts by weight of propylene carbonate. The glass tube containing each sample was sealed after completely replacing the gas atmosphere above the electrolyte liquid by Ar gas and, in that state, was kept heated at 90° C. for 1000 hr.

After the lapse of 1000 hr the samples were taken out of the glass tubes and were each subjected to voltametry in a glove box $N_2$ gas atmosphere using a fresh electrolyte liquid, which was prepared by adding 0.2 wt% of water to propylene carbonate and dissolving 1 mole of $LiClO_4$ in 1 liter of the water-containing propylene carbonate. For the Prussian blue film samples, the potential of each sample electrode (vs. Ag/AgCl) was continuously varied over the range from −0.5 V to +1.2 V at a sweep rate of 10 mV/sec to obtain a cyclic voltamogram. For the $WO_3$ film samples, the potential of each sample electrode (vs. Ag/AgCl) was continuously varied over the range from −0.65 V to +1.0 V at a sweep rate of 10 mV/sec. For each sample the quantity of electricity transferred at the coloring and bleaching reactions was calculated from the cyclic voltamogram and compared with the value measured on the same Prussian blue or $WO_3$ film before the 90° C. aging test. It was revealed that the quantity of electricity of the samples subjected to the 90° C. aging test depended significantly on the content of water in the electrolyte liquid used in the aging test.

Figure 2:
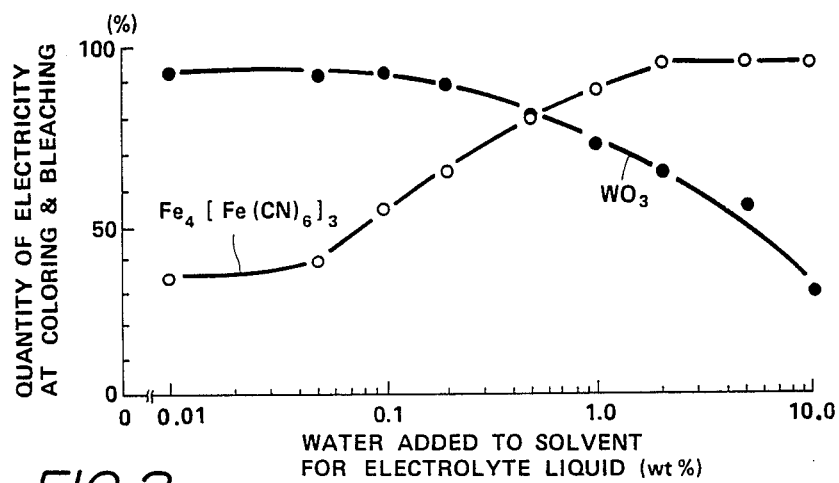
FIG. 2 is a graph showing the influence of the content of water in the electrolyte liquid in the device of FIG. 1 on the high temperature endurance of the electrochromic materials in the same device.

For each of the $WO_3$ film and the Prussian blue film, FIG. 2 shows the observed relationship between the amount of water added to the solvent for the electrolyte liquid and the quantity of electricity at coloring and bleaching of the tested film in percentages to the initial value obtained before the 90° C. aging test. With respect to the Prussian blue film after the aging test, the quantity of electricity became very small when the content of water in the electrolyte liquid was less than about 0.1 wt% and gradually neared the initial value as the content of water was increased. Initially, the Prussian blue film assumed a deep blue color when electrochemically oxidized. After the 90° C. aging test, the color of the Prussian blue film in the oxidized state became very pale and almost transparent when the content of water in the electrolyte liquid was less than about 0.1 wt% and neared the initial blue color as the content of water was increased. With respect to the $WO_3$ film, the experimental result respresented by the curve in FIG. 2 agrees with the well known fact that the quantity of electricity at coloring and bleaching after aging at high temperatures becomes smaller as the content of water in the electrolyte liquid becomes higher. Based on these experimentally confirmed relationships the present invention proposes to limit the amount of water added to the organic solvent as the liquid component of the electrolyte liquid within the range from 0.2 to 3.0 wt% to thereby enhance the durability of the electrochromic device at high temperatures.

EXAMPLE 1

Samples of a variable light transmittance glass board of the construction shown in FIG. 1 were produced in the following manner.

The top and bottom glass substrates 10 and 20 were 10 cm × 10 cm in widths and 0.1 cm in thickness. Each of the transparent electrode films 12 and 22 was formed by vacuum deposition of $SnO_2$ onto the glass substrate surface to a thickness of 3000 Å. The first electrochromic layer 14 was formed by vacuum deposition of $WO_3$ onto the electrode film 12 to a thickness of 4000 Å. The second electrochromic layer 24 was formed by electrodeposition of Prussian blue from an aqueous solution containing 0.01 mole/liter of $FeCl_3$ and 0.01 mole/liter of $K_3Fe(CN)_6$ onto the electrode film 22 to a thickness of 3000 Å. The peripheral seal layer 18 was formed of an epoxy resin and had a thickness of 1 mm. To produce five kinds of samples different in the content of water in the electrolyte liquid 30, 0.2 wt%, 0.5 wt%, 1.0 wt%, 2.0 wt% or 3.0 wt% of water was added to propylene carbonate, and 1 mole of $LiClO_4$ was dissolved in 1 liter of the water-containing propylene carbonate.

These samples of the variable light transmittance glass board were placed in a constant temperature oven maintained at 90° C. and were left standing in the oven for 1000 hr. After that, the electrochromic function of each sample was examined at room temperature by continuously varying the potential of the electrode 22 overlaid with the Prussian blue film 24 (vs. the opposite electrode 12 overlaid with $WO_3$) over the range from −1.0 V to +1.5 V at a sweep rate of 10 mV/sec. The quantity of electricity at coloring and bleaching of each sample was compared with the initial value measured on the same sample before the 90° C. aging test. The results are shown in FIG. 3 together with the results obtained in the following comparative example.

COMPARATIVE EXAMPLE 1

Five kinds of samples of a variable light transmittance glass board of the construction shown in FIG. 1 were produced in the same manner as in Example 1, except that the amount of water added to propylene carbonate was varied to 0.01 wt%, 0.05 wt%, 0.1 wt%, 4.0 wt% and 10.0 wt%, respectively. Every sample was subjected to the 90° C. aging test described in Example 1 and thereafter subjected to the voltametry described in Example 1.

Figure 3:
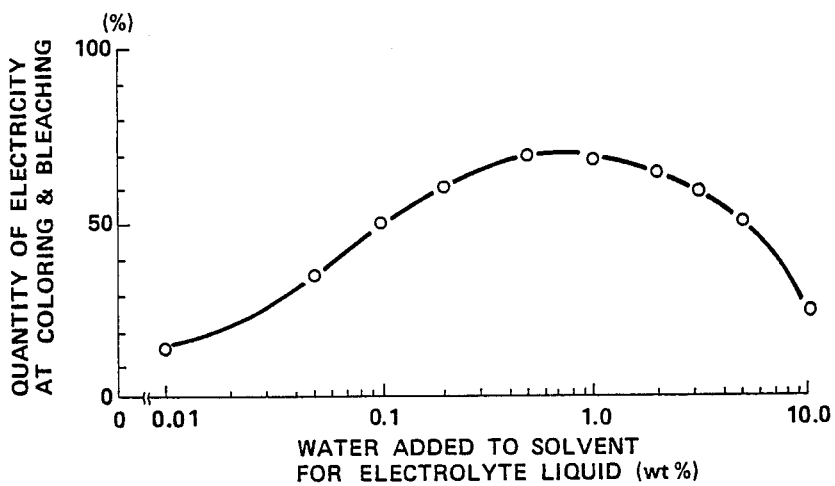
FIG. 3 is a graph showing the influence of the content of water in the electrolyte liquid in the device of FIG. 1 on the high temperature endurance of the same device in respect of the quantity of electricity transferred at coloring and bleaching reactions of the electrochromic layers.

As can be seen in FIG. 3, in the samples produced in Example 1, wherein 0.2–3.0 wt% of water was added to the solvent for the electrolyte liquid 30, the quantity of electricity at coloring and bleaching measured after aging at 90° C. for 1000 hr was not less than 60% of the initially measured value. In the samples produced in Comparative Example 1, the quantity of electricity measured after the same aging test was not more than 50% of the initially measured value whether the amount of the added water was large or small. The reason will be understood from the foregoing description with reference to FIG. 2.

Figure 4:
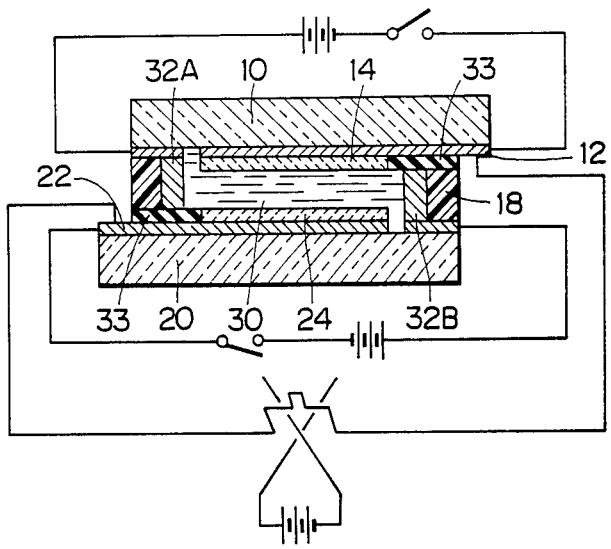
FIG. 4 is a sectional and schematic view of another variable light transmittance glass board according to the invention.

FIG. 4 shows a modification of the variable light transmittance glass board of FIG. 1. The modification is according to the proposal of Japanese publication No. 59-159134 mentioned hereinbefore. The glass board or electrochromic device of FIG. 4 has all the elements described with reference to FIG. 1, and additionally has two auxiliary electrodes 32A and 32B respectively disposed in marginal areas of the space defined between the two glass substrates 10 and 20. Each of the auxiliary electrodes 32A, 32B is electrically insulated from the transparent electrode films 12, 22. Numeral 33 indicates an insulating film used to insulate each auxiliary electrode 32A or 32B from the closely located transparent electrode film 12 or 22. The auxiliary electrodes 32A, 32B are formed of a mixture of a conductive material such as carbon black or platinum powder, a compound that undergoes electrochemical oxidation and reduction and a binder.

The auxiliary electrodes 32A, 32B are provided for preventing decomposition of the electrolyte liquid 30 at the initial reduction of the first or second electrochromic layer 14 or 24 by simultaneous oxidation of the electrochemically reactive compound in the auxiliary electrode material. Furthermore, the auxiliary electrodes 32A, 32B are used to enhance the color-retaining capability of the electrochromic device. That is, the blue color developed by reduction of the $WO_3$ layer 14 and oxidation of the Prussian blue layer 24 can be prevented from fading after stopping applying the coloring voltage across the principal electrodes 12 and 22 of the device by keeping the $WO_3$ layer 14 at a negative potential versus the auxiliary electrode 32A and the Prussian blue layer 24 at a positive potential versus the auxiliary electrode 32B. According to the Japanese publication No. 59-159134, Prussian blue is recommended as the electrochemically oxidizable and reducible material for the auxiliary electrodes 32A, 32B though it is also possible to use a certain inorganic material such as iron cyano-cobalt complex, iron cyano-ruthenium complex, diiridium trioxide or nickel oxide.

It is desirable that the electrochemically reactive material in the auxiliary electrodes 32A, 32B is large in the quantity of electricity which a given volume of that material gains by its oxidation reaction (hereinafter, "the quantity of electricity at oxidation reaction" will be used in this sense) because it is desirable to make the auxiliary electrodes 32A, 32B small in size. Among the above-named materials Prussian blue is relatively large in the quantity of electricity at oxidation reaction, but it is not very large in absolute value. Besides, when water is present in the electrolyte liquid 30 the oxidation of Prussian blue in either of the auxiliary electrodes 32A, 32B causes discoloration of the first or second electrochromic layer 14 or 24 in a marginal area close to the oxidized auxiliary electrode.

Figure 5:
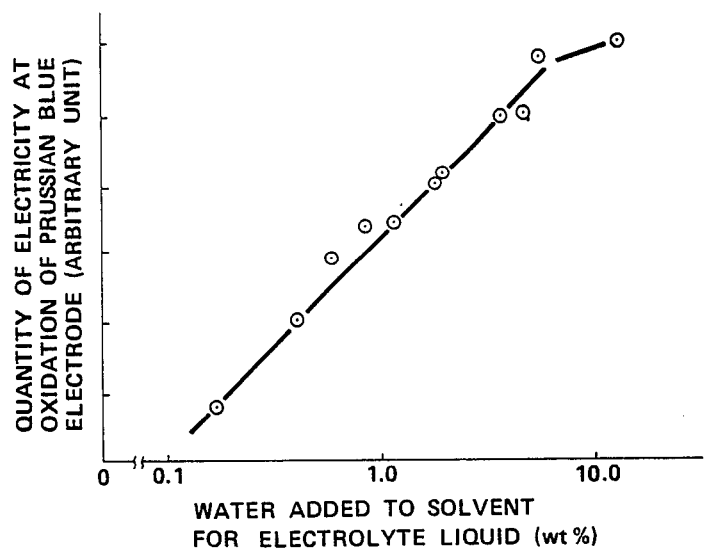
FIG. 5 is a graph showing the influence of the content of water in the electrolyte liquid in the device of FIG. 4 on the electrochemical reactivity of a previously proposed auxiliary electrode material.

By voltametry using an electrolyte liquid prepared by dissolving 1 mole of NaClO$_4$ in 1 liter of propylene carbonate containing a variable amount of water, it was revealed that the quantity of electricity at oxidation reaction of a given volume of Prussian blue increases in proportion to the content of water in the electrode liquid, as shown in FIG. 5. By further studies we have confirmed that when Prussian blue in the auxiliary electrode undergoes oxidation reaction there occurs decomposition of a small amount of water on the surface of Prussian blue. In this case the decomposition of water will be represented by one or both of the following equations.

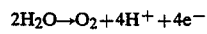

$$2H_2O \rightarrow O_2 + 4H^+ + 4e^-$$

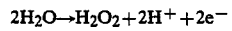

$$2H_2O \rightarrow H_2O_2 + 2H^+ + 2e^-$$

Probably the oxygen and/or hydrogen peroxide formed by the decomposition of water will be the cause of the discoloration of the electrochromic layer in a region close to the oxidized auxiliary electrode. A simple measure to prevent such discoloration is to increase the distance between each auxiliary electrode 32A, 32B and the electrochromic layers 14, 24. However, this measure has a disadvantage that an effective displaying area or light transmitting area of the electrochromic device or variable light transmittance glass board decreases.

In the present invention a conjugated polymer is used as the electrochemically oxidizable and reducible material for the auxiliary electrodes 32A, 32B. Examples of suitable conjugated polymers are polyacetylene, polyphenylene, polytriphenylamine, polypyrrole, polyindole, polyazulene, polythiophene, polyfuran, polynaphthalene, polyaniline, polydiacetylene, polyphenylene sulfide, polyphenylene oxide and polyphenylenevinylene. These polymers are large in the quantity of electricity at oxidation of a given volume, and oxidation reactions of these polymers are not influenced by the content of water in the electrolyte liquid. Furthermore, these polymers are stable in both oxidant and reductant and good in high temperature resistance (above 150° C.) and moisture resistance, and can easily be incorporated in the auxiliary electrodes in the state of reductant. Among the above named conjugated polymers it is preferable to select one which is stable in air and begins to undergo oxidation reaction at a potential below about +1.0 V versus the standard silver-silver chloride electrode.

Usually an auxiliary electrode for use in this invention is produced by the following process. First, a powder of a selected conjugated polymer is blended with a conductive powder such as acetylene black, platinum powder or gold powder and an electrochemically inactive binder such as polytetrafluoroethylene. The blend is kneaded under adequate heating and then press-shaped into a sheet form. A meshwork of a suitable metal such as platinum, titanium, tantalum or tungsten is sandwiched between two pieces of the sheet-formed composition, and the resultant laminate is compressed to a desired thickness and into a desired shape. The shaped electrode material is dried, for example, at 150°–250° C. for 1–2 hr.

In the case of using a polymer of a conjugated heterocyclic compound such as furan, pyrrole or thiophene, it is also possible to produce an auxiliary electrode by depositing the polymer on a charge collector such as a meshwork of platinum or carbon fiber by an electrolytic polymerization method. For example, when the electrolytic polymerization is carried out in a mixed solution of 0.1 mole/liter of a conjugated monomer and 0.1 mole/liter of lithium perchlorate in acetonitrile by sweeping the electrode potential at a rate of 10 mV/sec, the oxidation potential (vs. S.C.E.) is as shown in Table 1.

TABLE 1

| Monomer | Oxidation Potential v.s. S.C.E. (V) |
| --- | --- |
| pyrrole | +0.8 |
| indole | +0.9 |
| azulene | +0.9 |
| 3-methylthiophene | +0.75 |
| furan | +1.8 |

EXAMPLE 2A

An auxiliary electrode sample was produced by the following process.

First, 6 parts by weight of polytriphenylamine in powder form was blended with 3 parts by weight of acetylene black used as a conductive material and 1 part by weight of polytetrafluoroethylene used as binder. The blend was kneaded in a roll kneader at an elevated temperature and then press-shaped into a sheet. A meshwork of a thin titanium wire was sandwiched between two pieces of the polytriphenylamine composition sheet, and the laminate was compressed by using a roller press so as to form an auxiliary electrode sample which was 1 cm×1 cm in widths and 0.8 mm in thickness. The electrode sample was completely dried at an elevated temperature.

EXAMPLE 2B

Another auxiliary electrode sample of the same dimensions was produced by depositing poly(3-methylthiophene) on a meshwork of carbon fiber by an electrolytic polymerization method under the conditions shown in Table 1.

EXAMPLE 2C

Another auxiliary electrode sample of the same dimensions was produced by depositing polypyrrole on a meshwork of carbon fiber by an electrolytic polymerization method under the conditions shown in Table 1.

COMPARATIVE EXAMPLE 2

First, 3 parts by weight of Prussian blue in powder form was blended with 2 parts by weight of acetylene black and 1 part by weight of polytetrafluoroethylene. Using this blend in place of the polytriphenylamine composition in Example 2A, an auxiliary electrode sample of the same dimensions was produced by the same process as in Example 2A.

The auxiliary electrode samples of Examples 2A, 2B and 2C and Comparative Example 2 were each subjected to an oxidation test in an electrolyte liquid prepared by dissolving 1 mole of LiClO$_4$ in 1 liter of propylene carbonate containing 1 wt% of water at a constant current of 0.5 mA to measure the quantity of electricity at oxidation reaction per unit volume of each sample electrode. The results are shown in Table 2.

TABLE 2

| Auxiliary electrode | Oxidized Substance | Quantity of Electricity at Oxidation Reaction (C/cm$^2$, per unit volume) |
| --- | --- | --- |
| Example 2A | polytriphenylamine | 10.5 |
| Example 2B | poly(3-methylthiophene) | 9.8 |
| Example 2C | polypyrrole | 9.2 |
| Comparative Example 2 | Prussian blue | 3.0 |

EXAMPLES 3A–3C

Figure 6:
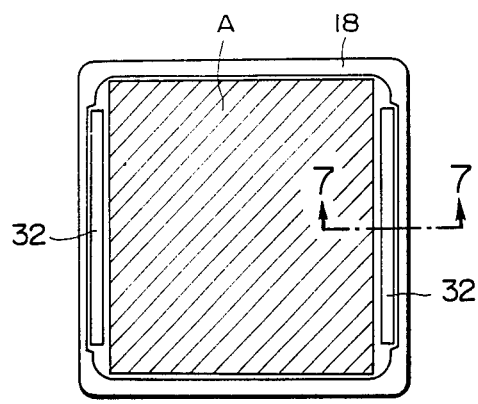
FIG. 6 is a plan view of a variable light transmittance glass board which is fundamentally similar to the device of FIG. 4.
Figure 7:
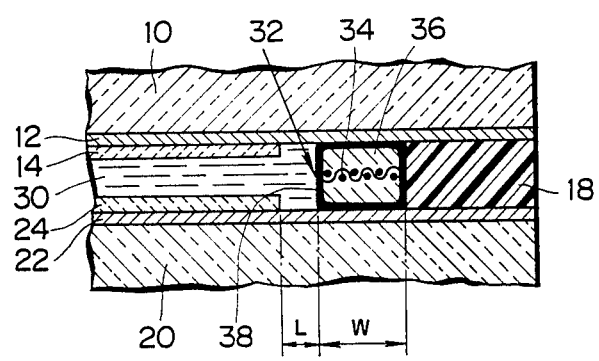
FIG. 7 is an explanatorily enlarged sectional view taken along the line 7—7 in FIG. 6.

FIGS. 6 and 7 show a variable light transmittance glass board produced in Example 3A, which was as large as 400 mm×400 mm in widths. The construction of this board was substantially as shown in FIG. 4, including two auxiliary electrodes 32. The production process was as follows.

The top and bottom glass substrates 10 and 20 were 400 mm×400 mm in widths and 3.5 mm in thickness, and each of the transparent electrode films 12 and 22 was formed by sputtering of SnO$_2$ onto the glass substrate surface to a thickness of 3000 Å. The first electrochromic layer 14 was formed by vacuum deposition of WO$_3$ onto the electrode film 12 to a thickness of 4000 Å. The second electrochromic layer 24 was formed by electrodeposition of Prussian blue on the electrode film 22 to a thickness of 3000 Å. The reactants used for the electrodeposition were as mentioned in Example 1. Each of the two auxiliary electrodes 32 was produced in accordance with Example 2A. In FIG. 7, numeral 34 indicates the charge collector which was a meshwork of titanium wire in this case, and numeral 36 indicates the blend of polytriphenylamine, acetylene black and polytetrafluoroethylene. The essential part of each auxiliary electrode 32 was in the shape of a strip 300 mm long and 0.8 mm thick. This strip was wrapped with an insulating cover 38, which was a nonwoven cloth of polypropylene having a thickness of 0.1 mm. Therefore, each auxiliary electrode 32 including the insulating cover 38 was approximately 1 mm thick. The peripheral seal layer 18 was formed of a mixture of a silicone rubber and an epoxy resin and had a thickness of 1 mm. Referring to FIG. 6, the width of the seal layer 18 was somewhat narrowed in regions along the respective auxiliary electrodes 32. The electrolyte liquid 30 was prepared by adding 2.0 wt% of water to propylene carbonate and dissolving 1 mole of LiClO$_4$ in 1 liter of the water-containing propylene carbonate.

In Example 3B, the production process of Example 3A was repeated except that the auxiliary electrodes 32 were produced in accordance with Example 2B using electrodeposited poly(3-methylthiophene).

In Example 3C, the same process was repeated except that the auxiliary electrodes 32 were produced in accordance with Example 2C using electrodeposited polypyrrole.

COMPARATIVE EXAMPLE 3

The production process of Example 3A was repeated except that the auxiliary electrodes 32 were produced in accordance with Comparative Example 2 using Prussian blue.

In each of the variable light transmittance glass boards produced in Examples 3A–3C and Comparative Example 3, it was required that the quantity of electricity which the auxiliary electrodes 32 gain at their oxidation reaction be not smaller than 600 coulombs. To meet this requirement, the width W of each auxiliary electrode 32 (300 mm long and 0.8 mm thick) must be determined with consideration of the basic data shown in Table 2. The distance L between each auxiliary electrode 32 and the side edge of an effective light transmitting area A of the glass board must be determined with consideration of the discoloring influence of the oxidation reaction of the auxiliary electrode. In the glass boards produced in Examples 3A–3C and Comparative Example 3, appropriate values of the width W and the distance L are as shown in Table 3.

TABLE 3

| | Reactive Substance in Auxiliary Electrodes | Width W (mm) | Distance L (mm) |
| --- | --- | --- | --- |
| Ex. 3A | polytriphenylamine | 8 | 1 |
| Ex. 3B | poly(3-methylthiophene) | 10 | 1 |
| Ex. 3C | polypyrrole | 10 | 1 |
| Comp. Ex. 3 | Prussian blue | 30 | 10 |

As will be understood from Table 3, in the variable light transmittance glass boards of Examples 3A–3C it was possible to considerably enlarge the effective area A than in the board of Comparative Example 3. Particularly in the case of Example 3A using polytriphenylamine the dimensions of the effective area A became about 350 mm×360 mm, which means about 20% increase from the effective area A in the case of Comparative Example 3, viz. about 290 mm×360 mm.

What is claimed is:

1. A variable light transmittance glass board which is functional as an electrochromic cell and which comprises:

two transparent glass substrates each of which is laid with a transparent electrode film and which are arranged such that the two transparent electrode films are held opposite to and spaced from each other;

a first electrochromic layer which comprises tungsten trioxide and is formed on one of the two transparent electrode films;

a second electrochromic layer which comprises Prussian blue and is formed on the other of the two electrode films; and an electrolyte liquid which fills up the space remaining between the two transparent electrode films, said electrolyte liquid being a solution of a supporting electrolyte in an organic polar solvent to which 0.2 to 3.0 wt% of water is added.

2. A variable transmittance glass board according to claim 1, wherein said supporting electrolyte is an alkali metal compound.

3. A variable transmittance glass board according to claim 2, wherein said supporting electrolyte is a lithium compound selected from the group consisting of LiClO$_4$, LiPF$_6$ and LiBF$_4$.

4. A variable transmittance glass board according to claim 2, wherein said organic polar solvent is selected from the group consisting of propylene carbonate, acetonitrile, dimethylformamide and °-butyl lactone.

5. A variable transmittance glass board according to claim 1, further comprising an auxiliary electrode which is disposed in a marginal region of the space between said two transparent glass substrates so as to be in contact with said electrolyte liquid and comprises an electrochemically oxidizable and reducible polymer of a conjugated compound.

6. A variable transmittance glass board according to claim 5, wherein said polymer is selected from the group consisting of polyacetylene, polyphenylene, polytriphenylamine, polypyrrole, polyindole, polyazulene, polythiophene, polyfuran, polynaphthalene, polyaniline, polydiacetylene, polyphenylene sulfide, polyphenylene oxide and polyphenylenevinylene.

7. A variable transmittance glass board according to claim 5, wherein said auxiliary electrode further comprises an electroconductive inorganic material.

8. A variable transmittance glass board according to claim 7, wherein said electroconductive inorganic material is a powder, said auxiliary electrode further comprising a charge collector member which is embedded in a mixture comprising said polymer and said powder.

9. A variable transmittance glass board according to claim 5, wherein said auxiliary electrode further comprises a charge collector member on which said polymer is deposited.

* * * * *